US012545307B2

(12) United States Patent
Chowenhill et al.

(10) Patent No.: US 12,545,307 B2
(45) Date of Patent: Feb. 10, 2026

(54) RECONFIGURABLE PCB FOR BRAKE OPERATION OF EXIT AND ENTRANCE CROSSING GATE MECHANISM

(71) Applicant: Siemens Mobility, Inc., New York, NY (US)

(72) Inventors: Leah Chowenhill, Pittsburgh, PA (US); Quinton Reed, Oil City, PA (US); Daniel Spencer, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 540 days.

(21) Appl. No.: 18/005,778

(22) PCT Filed: Aug. 6, 2020

(86) PCT No.: PCT/US2020/045095

§ 371 (c)(1),
(2) Date: Jan. 17, 2023

(87) PCT Pub. No.: WO2022/031284

PCT Pub. Date: Feb. 10, 2022

(65) Prior Publication Data

US 2023/0271639 A1 Aug. 31, 2023

(51) Int. Cl.
*B61L 29/22* (2006.01)
*H02P 3/00* (2006.01)

(52) U.S. Cl.
CPC ................ *B61L 29/22* (2013.01); *H02P 3/00* (2013.01)

(58) Field of Classification Search
CPC .......... B61L 29/00; B61L 29/08; B61L 29/14; B61L 29/16; B61L 29/18; B61L 29/22
See application file for complete search history.

(56) References Cited

U.S. PATENT DOCUMENTS

| | | | | |
|---|---|---|---|---|
| 2002/0185571 | A1 | 12/2002 | Ablett et al. | |
| 2005/0284987 | A1 | 12/2005 | Kande et al. | |
| 2019/0351926 | A1 * | 11/2019 | Ibarra | B61L 29/30 |

OTHER PUBLICATIONS

Siemens Rail Automation Corporation: "Installation & Maintenance S-60 Highwaygrade Crossing Gate"; vol. 74050 version No. F; Jun. 2017; pp. 1-158; XP009527025; Retrieved from the Internet: URL: https://assets.new.siemens.com/siemens/assets/api/uuid:45bdald4-eed3-4e09-acdc-02efabb3317c/siemens-074050-rev-f-s-60-crossing-gate.pdf.

* cited by examiner

*Primary Examiner* — Robert J McCarry, Jr.

(57) ABSTRACT

A crossing gate mechanism (300) with a PCB reconfigurable for exit and entrance gate mode, the mechanism including a brake and a brake relay (312) coupled to an electric motor (320), the mechanisms being configured to operate a crossing gate arm of a crossing gate. The mechanism includes a configuration logic circuit (310) connected to the brake relay (312), and a internal power source (316), wherein the configuration logic circuit (310) is configured to operate the brake relay (312) in a entrance gate mode or exit gate mode, wherein the control of the brake relay is inverted in the exit gate mode with respect to the entrance gate mode, and wherein, in the exit mode, the internal power source (316) provides power for operating the brake relay (312).

10 Claims, 3 Drawing Sheets

RECONFIGURABLE PCB FOR BRAKE OPERATION OF EXIT AND ENTRANCE CROSSING GATE MECHANISM

BACKGROUND

1. Field

Aspects of the present disclosure generally relate to a crossing gate mechanism, in particular to a crossing gate mechanism that can be configured as a mechanism for an exit gate or an entrance gate, used for example in connection with railroad grade crossings.

2. Description of the Related Art

Railroad grade crossings, sometimes referred to as level crossings, are locations at which railroad tracks intersect roads. A constant warning time device, also referred to as a grade crossing predictor (GCP) or a level crossing predictor, is an electronic device that is connected to the rails of a railroad track and is configured to detect the presence of an approaching train and determine its speed and distance from a railroad grade crossing. The constant warning time device, in combination with a crossing controller, will use this information to generate constant warning time signal(s) for controlling crossing warning device(s).

Crossing warning devices include for example crossing gates with crossing gate arms, crossing lights and/or crossing bells or other audio alarm devices. A crossing gate serves as a barrier across a highway when a train is approaching or occupying a crossing. Typically, crossing gates are either configured as an entrance gate or an exit gate including an entrance gate mechanism or exit gate mechanism, respectively. An entrance gate is installed on the normal vehicle entry side of a railroad crossing zone, wherein an exit gate is installed on the vehicle exit side of the crossing zone. The exit gates can be equipped with a delay and begin their descent to their horizontal position several seconds after the entrance gates do, to avoid trapping vehicles in the crossing zone. Currently, in order to convert an entrance gate to an exit gate, additional components or configurations are necessary, which incur additional costs, shipping time, installation time, maintenance etc.

SUMMARY

Briefly described, aspects of the present disclosure relate to a crossing gate mechanism, specifically to a crossing gate mechanism that can be configured as a mechanism for an exit gate or an entrance gate, used for example in connection with railroad grade crossings.

A first aspect of the present disclosure provides a crossing gate mechanism comprising a brake including a brake relay coupled to an electric motor configured to operate a crossing gate arm of a crossing gate, a configuration logic circuit connected to the brake relay, and an internal power source, wherein the configuration logic circuit is configured to operate the brake relay in a first mode or in a second mode, wherein the first mode is based on a first logical control and the second mode is based on a second logical control that is inverted with respect to the first logical control, and wherein, in the second mode, the internal power source provides power for operating the brake relay.

A second aspect of the present disclosure provides a method for operating a crossing gate mechanism comprising controlling a brake relay of a brake by a configuration logic circuit, the brake being coupled to an electric motor operating a crossing gate arm of an exit gate, and powering the brake relay by an internal power source, the internal power source being connected to the brake relay by the configuration logic circuit in response to multiple input signals.

A third aspect of the present disclosure provides a method for configuring a crossing gate mechanism comprising providing a configuration logic circuit for controlling a brake relay, the brake relay being coupled to an electric motor for operating a crossing gate arm, wherein the configuration logic circuit is configured such that the brake relay is operable in different gate modes, and switching a power supply of the brake relay between an external source and an internal power source depending on the gate mode.

DETAILED DESCRIPTION

To facilitate an understanding of embodiments, principles, and features of the present disclosure, they are explained hereinafter with reference to implementation in illustrative embodiments. In particular, they are described in the context of a crossing gate mechanism, configurable for an entrance gate or an exit gate utilized for example in railroad crossing gate applications.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
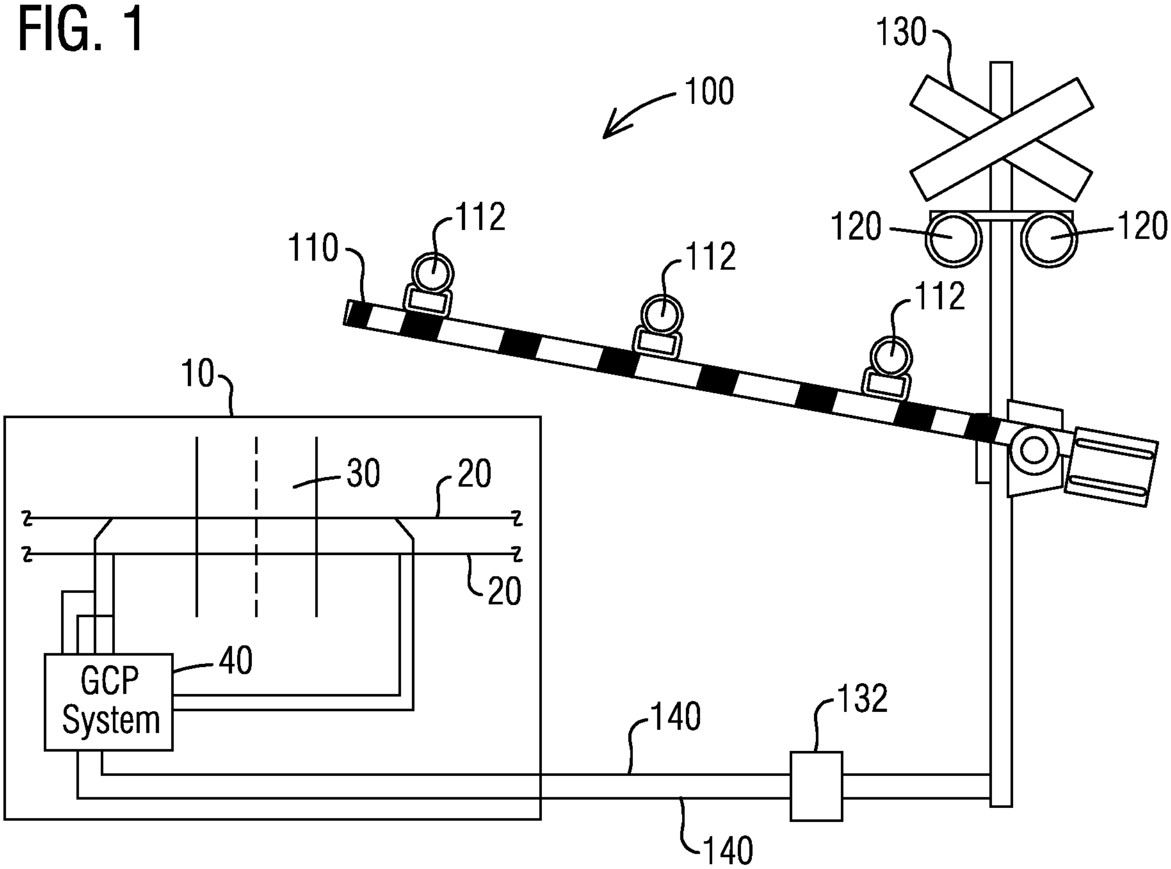
FIG. 1 illustrates an example railroad grade crossing, also referred to as level crossing, in accordance with an exemplary embodiment of the present disclosure.

FIG. 1 illustrates an example railroad grade crossing 100, also referred to as level crossing, in accordance with an exemplary embodiment of the present disclosure.

The railroad grade crossing 100 includes multiple railroad crossing warning devices, also referred to as grade crossing warning devices, which warn of an approach of a railroad vehicle, e.g. train, at the crossing of road 30 and railroad track 20. The railroad crossing warning devices include for example a crossing gate arm 110 with (or without) gate arm lights 112 spaced along the arm 110, crossing lights 120, railroad crossbuck 130, and/or other devices not illustrated herein, as for example crossing bells or other audio alarm devices. The crossing warning devices 110, 120, 130 are in communication with a constant warning time device 40, also referred to as grade crossing predictor or GCP, via connecting elements 140, which are for example electric cables. It should be noted that the components of FIG. 1 are illustrated schematically and are not drawn to scale, in particular are not drawn to scale in relation to each other.

The constant warning time device or GCP 40 is configured to detect the presence of an approaching train, determine its speed and distance from the railroad crossing, calculates when the train will arrive at the crossing, and uses this information to generate constant warning time signals for controlling the crossing warning devices 110, 120, 130. Typically, a normally energized master relay 132, only shown schematically herein, is arranged between the GCP 40 and the warning devices 110, 120, 130, for example along the connecting elements 140 and operably coupled by the connecting elements 140, wherein an output of the GCP 40 feeds a coil of the master relay 132. According to a pre-programmed time, for example a number of seconds and/or minutes, before projected arrival time of the approaching train, the GCP 40 is configured such that the output feeding the coil of the master relay 132 is turned off to drop the master relay 132 and to activate the crossing warning devices 110, 120, 130. It should be noted that the GCP 40, the master relay 132 and the warning time devices 110, 120, 130 will not be described in further detail as those of ordinary skill in the art are familiar with these devices and systems.

Figure 2:
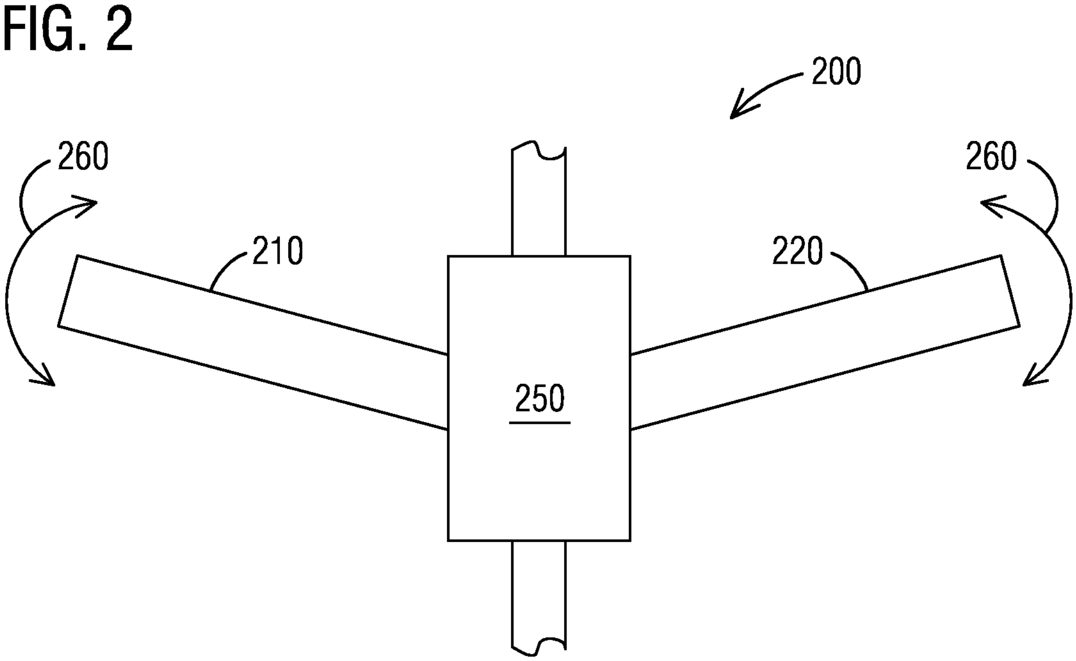
FIG. 2 illustrates a simplified view of a railroad crossing gate application in accordance with an exemplary embodiment of the present disclosure.

FIG. 2 illustrates a simplified view of a railroad crossing gate application 200 in accordance with an exemplary embodiment of the present disclosure. The railroad crossing gate application 200 is a crossing warning device and can be located at a crossing 100 as illustrated in FIG. 1, wherein the crossing warning device 110 can be configured as crossing gate 200.

The railroad crossing gate 200 comprises a first crossing gate arm 210 and a second crossing gate arm 220 which serve as barriers across a road or highway or sidewalk when a railroad vehicle, e.g. train, is approaching or occupying a crossing. The first crossing gate arm 210 can be configured as vehicle arm for roads, highways etc., and the second crossing gate arm 220 can be configured as pedestrian arm for sidewalks, or vice versa. The gate arms 210, 220 may comprise gate arm lights spaced along the arms 210, 220. It should be noted that the vehicle arm 210 is typically longer than the pedestrian arm 220. Further, it should be noted that the gate 200 may only comprise one gate arm 210 (or arm 220).

The railroad crossing gate 200 comprises a gate mechanism 250 for operating the crossing gate arm(s) 210, 220. Such mechanisms 250 comprise for example a gear train in combination with an electric motor for moving the gate arm(s) 210, 220 from a vertical position (when the gates are open) to a horizontal position (when the gates are closed). Direction of movement of the gate arms 210, 220 is illustrated by arrows 260. The gate mechanism 250 is either supported on the same post with a flashing light signal or separately mounted, for example on a pedestal adjacent to the flashing light signal post.

Figure 3:
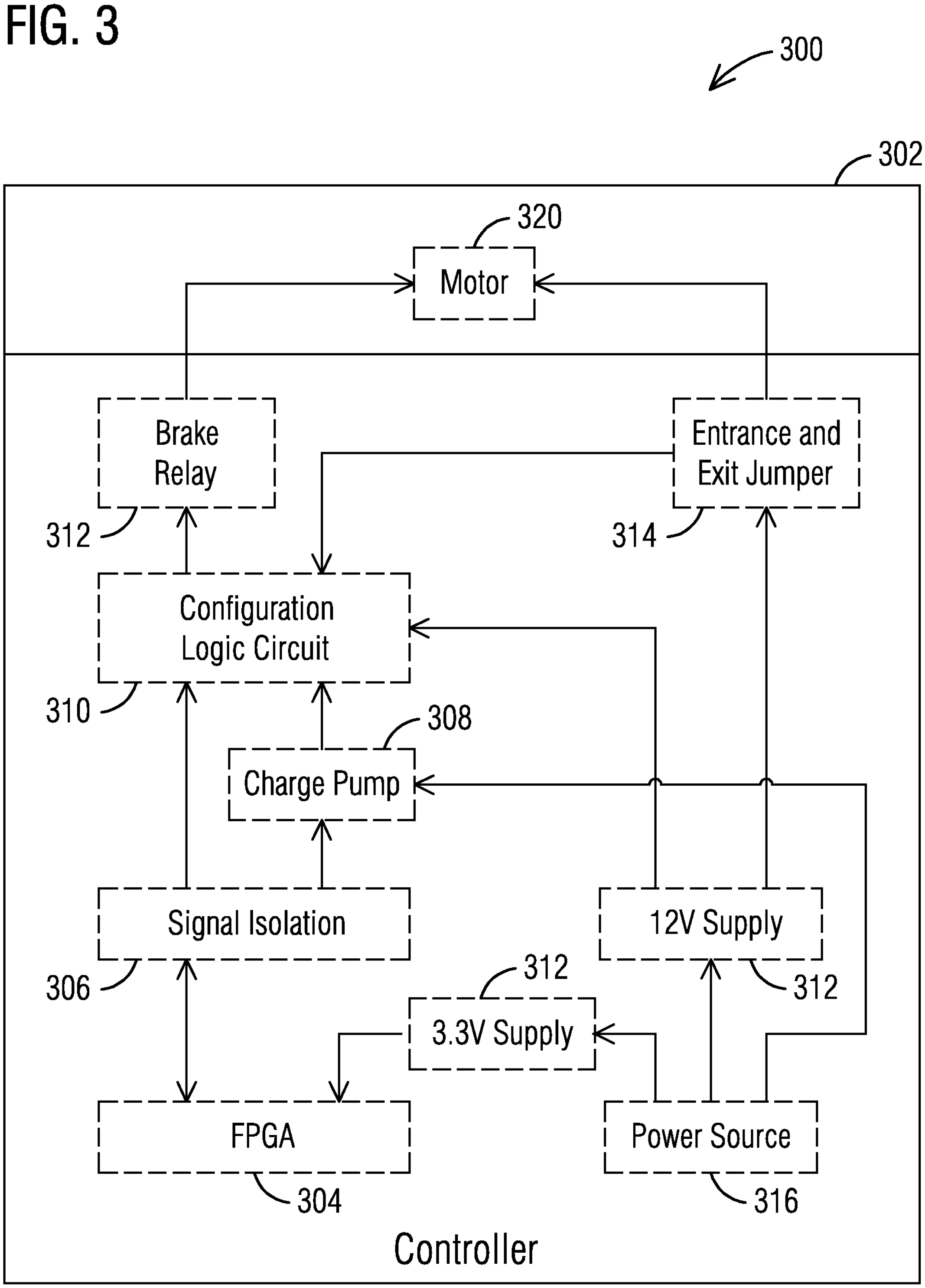
FIG. 3 illustrates a block diagram of a crossing gate mechanism in accordance with exemplary embodiments of the present disclosure.

FIG. 3 illustrates a block diagram of a crossing gate mechanism 300 in accordance with exemplary embodiments of the present disclosure.

In an exemplary embodiment, the crossing gate mechanism 300, herein also referred to as gate mechanism 300, comprises a controller 302 with an internal power source 316, also referred to as simply power supply 316, a field-programmable gate array (FPGA) 304, a signal isolation block 306, a charge pump 308, a configuration logic circuit 310, a brake relay 312, and an entrance and exit gate jumper 314. Further, the gate mechanism 300 includes electric direct current (DC) motor 320 for operating an associated crossing gate, such as for example gate 200 with gate arm 210 of FIG. 2, by way of the controller 302.

The controller 302 and/or the electric motor 320 can be coupled to, incorporated in, or otherwise associated with the gate 200. The gate crossing mechanism 300 controls the gate 200 at an intersection (i.e., crossing) of a railway and a road.

The power supply 316 comprises one or more batteries providing power, e.g. voltage, to one or more components. The charge pump 308 is powered by the power supply 316. Further, the power supply 316 provides 12V power to the configuration logic circuit 310 and the entrance and exit gate jumper 314. The configuration logic circuit 310 includes for example a printed circuit board (PCB) with electronic components providing the logic/functions for operation of the brake relay 312. Further, the power supply 316 provides 3.3V supply for operating the FPGA 304. Instead of one or more batteries, the power supply 316 may comprises other suitable power source(s).

The brake relay 312 is part of a brake operably coupled to the electric DC motor 320. The brake relay 312 comprises a relay coil which can be energized or de-energized. When energized, the brake relay 312 activates the brake coupled to the electric motor 320 and vice versa. The brake relay 312 is controlled, i.e. energized or de-energized, by the configuration logic circuit 310. The entrance and exit gate jumper 314, configured as either entrance gate jumper or exit gate jumper, enables the electric motor 320 to provide assistive force to the gate arm to cause the gate arm to lower to the closed position from the open position and vice versa.

As described before, currently, crossing gates are either configured as an entrance gate or an exit gate including a corresponding gate mechanism and configuration. For example, in order to convert an entrance gate to an exit gate, an additional circuit board, e.g. daughter card, may need to be added to the gate mechanism 300. However, with such an additional circuit board come additional costs, maintenance, installation etc.

In an exemplary embodiment of the present disclosure, the gate mechanism 300 can be configured as mechanism for an entrance gate or for an exit gate. The configuration logic circuit 310 is configured to operate the brake relay 312 in different gate modes, such as a first mode or a second mode. The first mode refers to an entrance gate mode and the second mode refers to an exit gate mode. The first mode is based on a first logical control and the second mode is based on a second logical control, wherein the second logical control is inverted with respect to the first logical control. The configuration logic circuit 310, the FPGA 304 and entrance/exit gate jumper 314 comprise the corresponding control logic, settings and components for operating the gate and gate mechanism in the respective mode, in this case the entrance gate mode.

In the entrance gate configuration or mode, a logic high ("1") means that the gate arm should be up, whereas a logic low ("0") means that the gate arm should be down. In this mode, the gate mechanism 300 uses a two-wire interface to receive gate control signals from an external source (not shown) that determine a state of the mechanism 300, i.e. move arm up, move arm down. A voltage level is then derived from the two-wire interface which powers the brake relay 312. The gate control signals are based on gate control voltage levels provided by the external source. In an example, a crossing bungalow provides the gate control signals and voltage levels (external source). Such a crossing bungalow or signal bungalow is typically located near the railroad crossing and houses signalling equipment for operating the crossing gates and other crossing devices.

In the entrance gate mode, an associated crossing gate arm is up and held in place by the brake and brake relay 312, powered from an external power source. When the gate is to be lowered, the brake relay 312 is de-energized and the gate arm is lowered down from vertical (90 degrees) to about 70 degrees. At 70 degrees, motor power of the motor 320 is cut and the moving mass will coast to the horizontal position or 0 degrees. Gravity holds the gate in the horizontal position. In the entrance gate mode, the entrance/exit gate jumper 314 is configured as entrance gate jumper 314 and enables the motor 320 to provide assistive force when raising the crossing gate arm.

In an exemplary embodiment, the configuration logic circuit 310 is configured to be operated in the second mode with a second logical control. The second logical control is inverted with respect to the first logical control and is utilized to operate the brake relay 312 in an exit gate mode. When in the exit mode, the gate and gate mechanism 300 operate in reverse of the entrance gate mode. The exit gate is designed to raise the gate arm in a loss of power condition clearing the exit portion of the crossing. This differs from the entrance gate which is designed to lower the arm in a loss-of-power condition blocking access to the crossing.

In the second mode (exit gate mode), the brake relay 312 cannot directly derive power from the gate control interface, because the interface provides the set logic, where the logic high ("1") means that the gate arm should be up, whereas a logic low ("0") means that the gate arm should be down. However, in the exit gate configuration, this logic is inverted. Therefore, a logic high ("1") means that the gate arm should be down, whereas a logic low ("0") means that the gate arm should be up. Thus, the brake relay 312 cannot directly derive power via the gate control interface. Instead, in the exit gate mode, the brake relay 312 is driven from a 12V high signal ("1") from the exit gate jumper 314, yet this supply is only connected when the gate control signal is a logic low ("0"). Thus, when the brake relay 312 is activated or energized when a high signal is provided by the exit gate jumper 314 and a low signal by the gate control interface.

Further, in the second mode, instead of the external power supply powering the brake relay 312, the internal power source 316 powers the brake relay 312. The entrance/exit gate jumper 314 is configured as exit gate jumper (for example the entrance/exit gate jumper 314 is manually/physically re-configured as exit gate jumper 314). The brake relay 312 receives voltage levels and the control signals from the exit gate jumper 314 and internal power source 316 to the brake relay 312.

In order to switch between the first mode (entrance gate mode) and the second mode (exit gate mode), certain modifications of the gate mechanism 300, including software and hardware modifications, may be necessary. For example, the FPGA 304 can function as either for an entrance gate or an exit gate, which depends on the FPGA firmware. This means that FPGA code needs to be modified for entrance gate mode or exit gate mode. This is different compared to conventional gate crossing mechanisms, which can only function as an entrance gate unless for example an additional logic card is attached, and different hardware is utilized.

The FPGA 204, for an entrance gate, releases the brake relay and the (entrance) gate of the gate crossing mechanism 300 moves to its default/safe state (e.g., down). For an exit gate, the FPGA 204 releases the brake relay and the (exit) gate of the gate crossing mechanism 300 moves to its default/safe state (e.g., up, 70 degrees from horizontal).

Further, the power source providing power to the brake relay 312 is switched from external source to internal source 316 (or vice versa). This can be accomplished by physically configuring the gate jumper 314 as exit gate jumper for the exit gate mode, or vice versa. This may include hardware modifications (for example a switch) of the gate jumper 314. In the exit gate mode, the brake relay 312 is driven from a 12V high signal ("1") from the exit gate jumper 314 and associated internal power source 316, yet this supply is only connected when the gate control signal is a logic low ("0"). Thus, when the brake relay 312 is activated or energized when a high signal is provided by the exit gate jumper 314.

The configuration logic circuit 310 performs the corresponding logic controls in the entrance gate mode or exit gate mode. Thus, the configuration logic circuit 310 processes and performs the corresponding logical control depending on the mode (entrance or exit gate mode) which is based on the configurations and input signals of the FPGA 304 and entrance/exit gate jumper 314.

The configuration logic circuit 310 including first logical control and second (inverted) logical control can be configured for example as software or a combination of software and hardware. The logical controls can be configured using a truth table including input and output variables (logical values), providing when the brake relay 312 is to be activated or not. Based on such a truth table, the configuration logic circuit 310 can be build or configured in many different ways, using for example computer executable instructions (software) only or in combination with hardware, such as computer chips (integrated circuit), diodes, FPGA etc.

In an exemplary embodiment, the configuration logic circuit 310 is based on a truth table for operating the gate mechanism 300 either as an entrance gate or exit gate. The truth table includes inputs and outputs. The inputs include digital inputs, which comprise logical values "0" or "1" for different elements of the gate mechanism 300, and/or analog inputs. Inputs include for example whether the gate mechanism 300 is set in the entrance gate mode or exit gate mode. The outputs include analog outputs, such as for example whether or not to connect the internal power source 316 to the brake relay 312. The truth table as described herein provides one possible logic implementation. It should be noted that multiple other alternative logic arrangements are possible. However, the logic of the configuration logic circuit 310 must be stringent to qualify for the application in the gate mechanism 300. Also, a design of the logic circuit 310 is required to be highly reliable since it is used for a crossing gate which needs to meet certain safety AREMA (American Railway Engineering and Maintenance-of-Way Association) regulations. Thus, in order to satisfy reliability and stringency, the logic of the logic circuit 310 includes a hamming distance of at least 4. Hamming distance is a metric for comparing two binary data strings. The hamming distance between two strings of equal length is the number of positions at which these strings vary. In other words, it is a measure of the minimum number of changes required to turn one string into another. A hamming distance of at least 4 for the logical controls of the logic circuit 310 provides safety and additional error protection.

The described logic circuit 310 and truth table in the crossing gate mechanism 300 are provided and utilized to invert the logical control of the brake relay 312. Therefore, a single gate mechanism 300 functions as both an exit gate and an entrance gate without necessitating an additional, external circuit. The described components allow the brake relay 312 to be correctly engaged (powered) in both an entrance and exit configuration by switching the relay coil voltage and corresponding ground.

As noted, the gate mechanism 300, which can function as entrance gate mechanism or exit gate mechanism without additional circuitry or components, needs to meet certain AREMA safety regulations. For example, it is a safety requirement that a gate crossing mechanism not be reconfigurable in the field. This way, someone cannot simply walk up to a gate mechanism and modify (hack) its settings. To accomplish this safety requirement, the gate mechanism 300 comprises the entrance/exit gate jumper 314 which is set according to the respective mode (entrance or exit mode) during manufacturing, and the need to re-program the FPGA 304. Thus, the gate mechanism 300 needs very little manual reconfiguration (jumpers and FPGA re-programming), which provides an improved and better solution than the current gate mechanisms that staunchly require entirely new hardware to be reconfigured.

Figure 4:
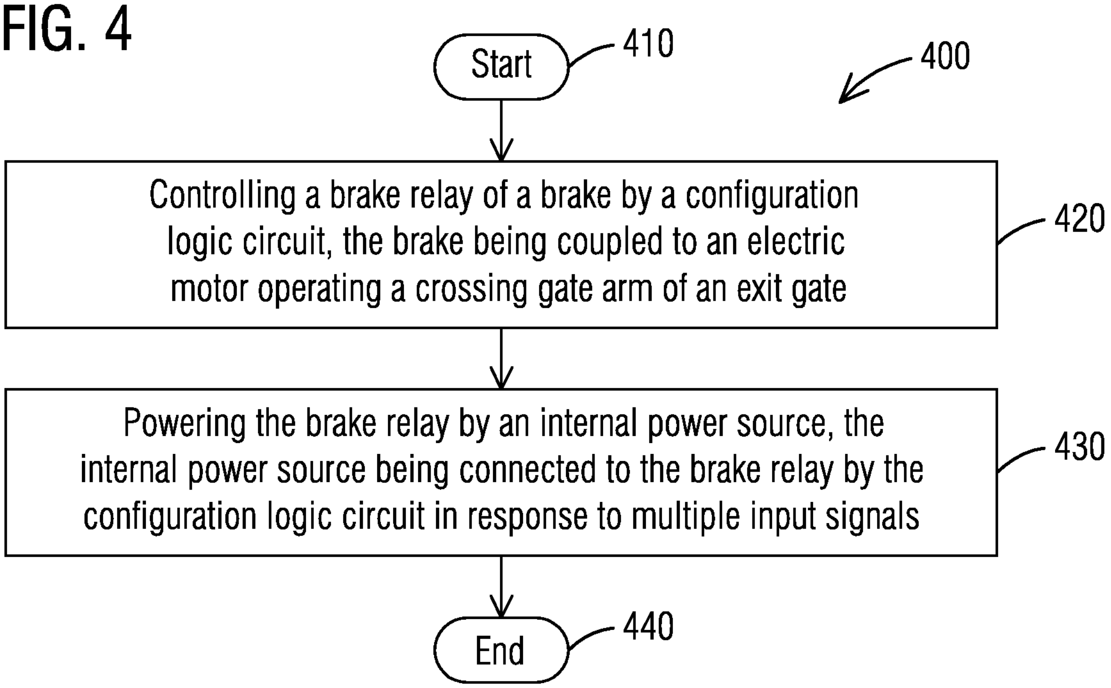
FIG. 4 illustrates a flow chart of a method for operating a crossing gate mechanism for an exit gate in accordance with an exemplary embodiment of the present disclosure.
Figure 5:
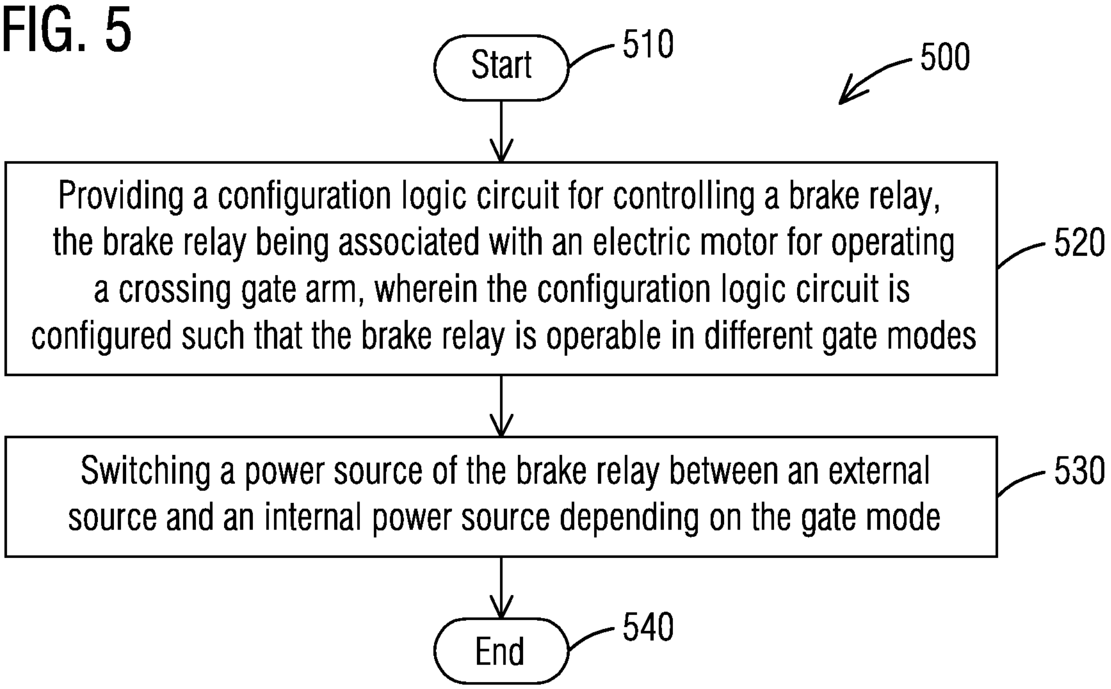
FIG. 5 illustrates a flow chart of a method for configuring a crossing gate mechanism in accordance with an exemplary embodiment of the present disclosure.

FIG. 4 illustrates a flow chart of a method 400 for operating a crossing gate mechanism for an exit gate, and FIG. 5 illustrates a flow chart of a method 500 for configuring a crossing gate mechanism in accordance with exemplary embodiments of the present disclosure.

While the methods 400 and 500 are described as a series of acts that are performed in a sequence, it is to be understood that the methods may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methods 400 and 500 relate to features and elements described in connection with the crossing gate mechanism 300. Thus, certain elements or features described within the methods relate to the mechanism 300, wherein the same reference numerals refer to the same elements or features of the figures.

The method 400 may start at 410. Act 420 comprises controlling the brake relay 312 of a brake by configuration logic circuit 310, the brake being coupled to electric motor 320 operating a crossing gate arm of an exit gate. Act 430 includes powering the brake relay 312 by the internal power source 316, the internal power source 316 being connected to the brake relay 312 by the configuration logic circuit 310 in response to multiple input signals. The input signals comprise signals and voltage levels by the exit gate jumper 314 and internal power source 316. The internal power source 316 is connected to the brake relay 312 when the gate control signal comprises a logic low (0). The input signals further comprise signals of the FPGA 304. At 440, the method may end.

The method 500 may start at 510. Act 520 comprises providing the configuration logic circuit 310 for controlling the brake relay 312, the brake relay 312 being coupled to the electric motor 320 for operating a crossing gate arm, wherein the configuration logic circuit 310 is configured such that the brake relay 312 is operable in multiple modes, i.e., entrance gate mode and exit gate mode. Act 530 comprises switching a power supply of the brake relay 312 between an external source and an internal power source 316. Further, the method 500 may include modifying the FPGA 304 for entrance gate mode or exit gate mode, the FPGA 304 providing gate control signals to the brake relay 312 via the configuration logic circuit 310. At 540, the method 500 may end.

It should be noted that the described components or functions of the gate mechanism 300 may be accomplished with different or additional components. The various components, modules, blocks, engines, etc. described herein can be implemented as instructions stored on a computer-readable storage medium, as hardware modules, as special-purpose hardware (e.g., application specific hardware, application specific integrated circuits (ASICs), application specific special processors (ASSPs), field-programmable gate arrays (FPGAs), as embedded controllers, hardwired circuitry, etc.), or as some combination or combinations of these. According to aspects of the present disclosure, the various components, modules, blocks, engines, etc. described herein can be a combination of hardware and programming. The programming can be processor executable instructions stored on a tangible memory, and the hardware can include a processing device for executing those instructions. Thus, a system memory can store program instructions that when executed by the processing device implement the engines described herein. Other engines can also be utilized to include other features and functionality described in other examples herein. In examples, the features and functions described herein can be implemented as an algorithm in an FPGA using a hardware description language. That is, one or more of the blocks of the methods 500, 600 can be implemented or using an FPGA according to one or more embodiments described herein. Similarly, one or more of the blocks of the method 500, 600 can be implemented on or using a processor, either individually and/or in combination with an FPGA, as described herein.

The invention claimed is:

1. A crossing gate mechanism comprising:

a brake including a brake relay coupled to an electric motor configured to operate a crossing gate arm of a crossing gate, a configuration logic circuit connected to the brake relay, and an internal power source, wherein the configuration logic circuit is configured to operate the brake relay in a first gate mode or in a second gate mode, the first gate mode being an entrance gate mode and the second gate mode being an exit gate mode, wherein the first gate mode is based on a first logical control and the second gate mode is based on a second logical control that is inverted with respect to the first logical control, and wherein, in the second gate mode, the internal power source provides power for operating the brake relay, and further comprising an entrance/exit gate jumper configured to enable the electric motor to provide assistive force to the crossing gate arm when in operation, wherein the brake relay receives the control signals from the entrance/exit gate jumper configured as an exit gate jumper, the control signals being based on voltage levels provided by the internal power source to the exit gate jumper.

2. The crossing gate mechanism as claimed in claim 1, wherein, in the second gate mode, the internal power source is connected via the exit gate jumper to the brake relay when a gate control signal of the external source comprises a logic low.

3. The crossing gate mechanism as claimed in claim 1, further comprising a field-programmable gate array providing control signals for the configuration logic circuit and the brake relay.

4. A railroad crossing gate comprising:

a crossing gate arm, and a crossing gate mechanism with a linkage operably coupled to the crossing gate arm, wherein the gate mechanism is configured as claim 1.

5. The crossing gate mechanism as claimed in claim 1, wherein the first gate mode is for operating the crossing gate as an entrance gate and wherein the second gate mode is for operating the crossing gate as an exit gate.

6. The crossing gate mechanism as claimed in claim 1, wherein the brake relay is operated by control signals and voltage levels.

7. The crossing gate mechanism as claimed in claim 1, wherein, in the first gate mode, the brake relay utilizes gate control signals and voltage levels from an external source via an interface.

8. The crossing gate mechanism as claimed in claim 1, wherein, in the second gate mode, the brake relay utilizes control signals and voltage levels from the internal power source.

9. A method for operating a crossing gate mechanism for an exit gate comprising:

controlling a brake relay of a brake by a configuration logic circuit, the brake being coupled to an electric motor operating a crossing gate arm of an exit gate, and powering the brake relay by an internal power source, the internal power source being connected to the brake relay by the configuration logic circuit in response to multiple input signals wherein the input signals comprise signals by an exit gate jumper and voltage levels of the internal power source provided via the exit gate jumper.

10. The method as claimed in claim 9, wherein the internal power source is connected to the brake relay when a gate control signal comprises a logic low.

* * * * *